(12) United States Patent
Forsberg et al.

(10) Patent No.: US 10,963,271 B2
(45) Date of Patent: Mar. 30, 2021

(54) SYSTEM, METHOD AND COMPUTER PROGRAM PRODUCT DELIVERING MOBILIZED DATA OBJECT TO MOBILE DEVICE OVER MULTIPLEXED NETWORK

(71) Applicant: salesforce.com, inc., San Francisco, CA (US)

(72) Inventors: Erik Forsberg, Los Angeles, CA (US); Bagrat Mazyan, Los Angeles, CA (US); Jason Schroeder, Los Angeles, CA (US); Deepak Kothule, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 523 days.

(21) Appl. No.: 15/417,151

(22) Filed: Jan. 26, 2017

(65) Prior Publication Data

US 2017/0177382 A1    Jun. 22, 2017

Related U.S. Application Data

(63) Continuation of application No. 13/399,991, filed on Feb. 17, 2012, now Pat. No. 9,600,575, which is a continuation of application No. 12/358,017, filed on Jan. 22, 2009, now Pat. No. 8,156,205.

(60) Provisional application No. 61/022,756, filed on Jan. 22, 2008, provisional application No. 61/022,754, filed on Jan. 22, 2008.

(51) Int. Cl.
| | | |
|---|---|---|
| *G06F 9/451* | (2018.01) | |
| *G06F 16/26* | (2019.01) | |
| *G06F 16/74* | (2019.01) | |
| *G06F 16/9535* | (2019.01) | |
| *G06F 16/9537* | (2019.01) | |
| *G06F 16/957* | (2019.01) | |
| *G06F 40/174* | (2020.01) | |
| *G06F 3/0482* | (2013.01) | |
| *H04L 29/08* | (2006.01) | |

(52) U.S. Cl.
CPC ............ *G06F 9/451* (2018.02); *G06F 3/0482* (2013.01); *G06F 16/26* (2019.01); *G06F 16/74* (2019.01); *G06F 16/9535* (2019.01); *G06F 16/9537* (2019.01); *G06F 16/9577* (2019.01); *G06F 40/174* (2020.01); *H04L 67/18* (2013.01); *H04L 67/26* (2013.01); *H04L 67/306* (2013.01)

(58) Field of Classification Search
CPC ........... G06F 9/451; G06F 16/26; G06F 16/74
See application file for complete search history.

(56) References Cited

U.S. PATENT DOCUMENTS

| | | | | |
|---|---|---|---|---|
| 7,730,110 | B2 * | 6/2010 | DeAnna ................. | G06F 9/465 707/803 |
| 9,836,446 | B2 * | 12/2017 | Brisebois .............. | G06F 17/243 |
| 10,007,767 | B1 * | 6/2018 | Ahmed ............... | G06F 21/6209 |

(Continued)

*Primary Examiner* — Keith D Bloomquist
(74) *Attorney, Agent, or Firm* — Holland & Hart LLP

(57) ABSTRACT

In accordance with embodiments, there are provided mechanisms and methods for receiving a command to define at least one mobilized object that implements a view for at least one mobile device of data retrieved from an on-demand service. These mechanisms and methods further include generating the mobilized object including the at least one instruction for defining the view for the at least one mobile device, and pushing the mobilized object to the at least one mobile device.

19 Claims, 8 Drawing Sheets

(56) References Cited

U.S. PATENT DOCUMENTS

| | | | |
|---|---|---|---|
| 2006/0161646 A1* | 7/2006 | Chene | H04L 63/102 709/223 |
| 2006/0212543 A1* | 9/2006 | O'Farrell | G06F 8/20 709/219 |
| 2006/0259577 A1* | 11/2006 | Fritsch | H04L 41/5054 709/217 |
| 2007/0061486 A1* | 3/2007 | Trinh | G06F 16/9577 709/246 |
| 2008/0107131 A1* | 5/2008 | Ma | H04L 41/0803 370/468 |
| 2008/0195664 A1* | 8/2008 | Maharajh | G06Q 10/10 |
| 2009/0049376 A1* | 2/2009 | Miller | G05B 19/042 715/273 |
| 2009/0063943 A1* | 3/2009 | Balasubramanian | G06F 17/2229 715/200 |
| 2009/0106155 A1* | 4/2009 | Castellanos | G06Q 10/0635 705/51 |
| 2010/0174974 A1* | 7/2010 | Brisebois | G06F 17/243 715/223 |
| 2011/0225417 A1* | 9/2011 | Maharajh | G06F 21/10 713/150 |

\* cited by examiner

FIGURE 5

SYSTEM, METHOD AND COMPUTER PROGRAM PRODUCT DELIVERING MOBILIZED DATA OBJECT TO MOBILE DEVICE OVER MULTIPLEXED NETWORK

CLAIM OF PRIORITY

This application claim priority to and is a continuation of U.S. application Ser. No. 12/358,017, entitled "SYSTEM, METHOD AND COMPUTER PROGRAM PRODUCT FOR CREATING MOBILE CUSTOM VIEWS FOR TENANTS OF AN ON-DEMAND DATABASE SERVICE", filed Jan. 22, 2009, now U.S. Pat. No. 8,156,205, issued Apr. 10, 2012, through U.S. application Ser. No. 13/399,991, entitled "SYSTEM, METHOD AND COMPUTER PROGRAM PRODUCT FOR CREATING MOBILE CUSTOM VIEWS FOR TENANTS OF AN ON-DEMAND DATABASE SERVICE", filed Feb. 17, 2012. U.S. application Ser. No. 13/399,991 is a is a continuation of U.S. application Ser. No. 12/358,017, which claims the benefit of U.S. Provisional Patent Application 61/022,754 entitled "METHOD AND SYSTEM FOR CREATING MOBILE CUSTOM VIEWS WITH FILTERING FOR TENANTS OF A MULTI-TENANT ON-DEMAND SERVICE," by Forsberg et al., filed Jan. 22, 2008, and U.S. Provisional Patent Application 61/022,756 entitled "METHOD AND SYSTEM FOR CREATING MOBILE CUSTOM VIEWS FOR TENANTS OF A MULTI-TENANT ON-DEMAND SERVICE," by Forsberg et al., filed Jan. 22, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to on-demand services, and more particularly to creating mobile custom views for tenants of such on-demand services.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

In some cases, the foregoing database frameworks are utilized in the context of mobile devices. For example, an administrator may desire to manage and configure mobile devices for an organization. Furthermore, the administrator may desire define or configure views for one or more mobile devices for the organization. However, defining a view for the mobile device at the mobile device may be burdensome and inefficient.

BRIEF SUMMARY

In accordance with embodiments, there are provided mechanisms and methods for creating mobile custom views for tenants of an on-demand database service. These mechanisms and methods for creating mobile custom views for tenants of an on-demand database service can enable embodiments to allow tenants to create and push instructions for generating user-defined views to mobile devices, etc. The ability of embodiments to provide such feature may allow tenants to efficiently and effectively create interfaces for mobile devices.

In an embodiment and by way of example, a method is provided for receiving a command to define at least one mobilized object that implements a view for at least one mobile device of data retrieved from an on-demand service, generating the mobilized object including the at least one instruction for defining the view for the at least one mobile device, and pushing the mobilized object to the at least one mobile device.

While the present invention is described with reference to an embodiment in which techniques for creating mobile custom views for tenants of an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 5 shows a user interface for creating and editing mobile view pages for a selected mobile object, in accordance with one embodiment.

DETAILED DESCRIPTION

General Overview

Systems and methods are provided for creating mobile custom views for tenants of an on-demand database service.

In some cases, on-demand database services are utilized in the context of mobile devices. For example, an administrator may desire to manage and configure mobile devices for an organization. Furthermore, the administrator may desire define or configure views for one or more mobile devices for the organization. However, defining a view for the mobile device at the mobile device may be burdensome and inefficient.

Thus, mechanisms and methods are provided herein for creating mobile custom views for tenants of an on-demand database service and can enable embodiments to allow tenants to create and push instructions for generating user-defined views to mobile devices, etc. The ability of embodiments to provide such feature may allow tenants to efficiently and effectively create interfaces for mobile devices.

Next, mechanisms and methods for creating mobile custom views for tenants of an on-demand database service.

Figure 1:
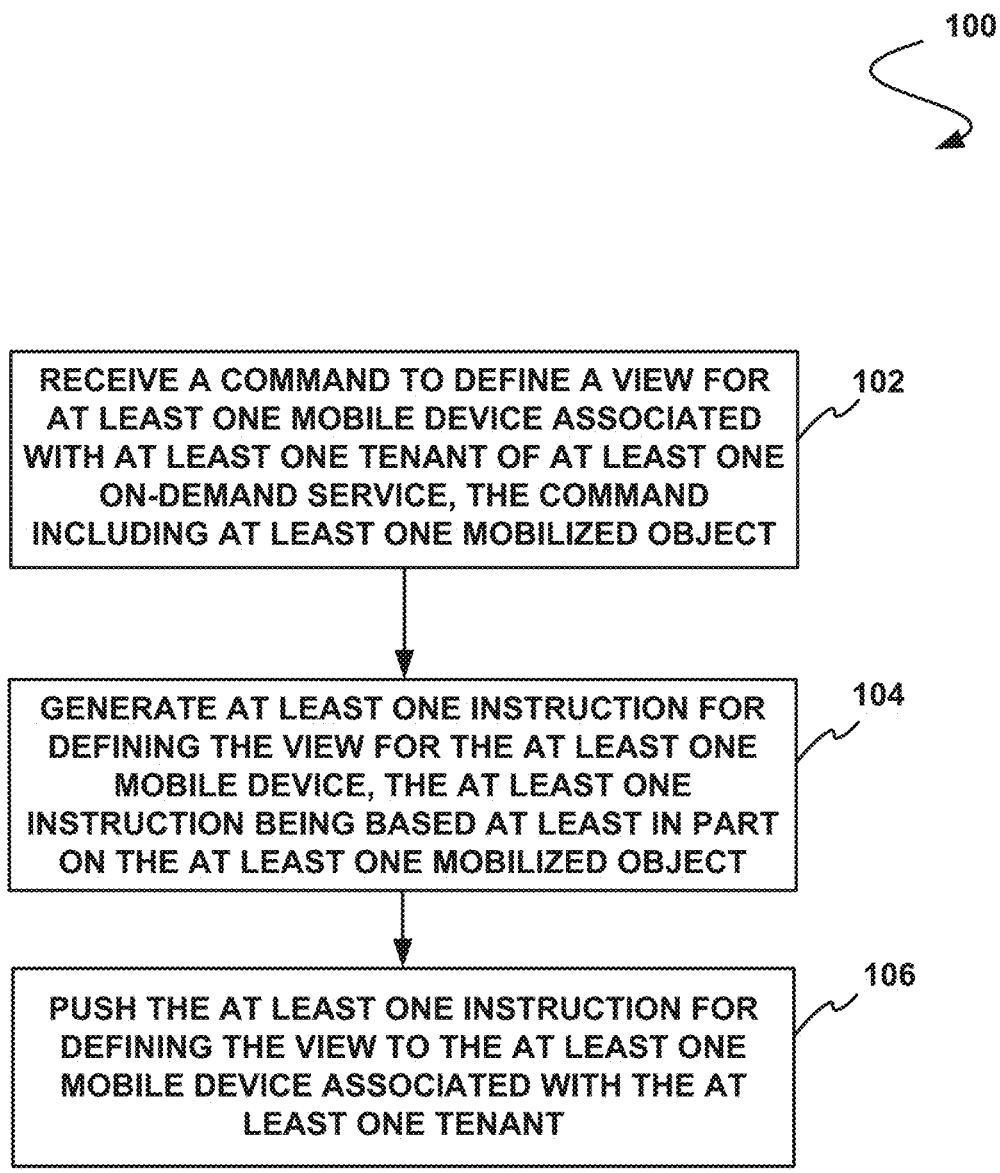
FIG. 1 shows a method for creating mobile custom views for tenants of an on-demand database service, in accordance with one embodiment.

FIG. 1 shows a method 100 for creating mobile custom views for tenants of an on-demand database service, in accordance with one embodiment. As shown, a command to define a view for at least one mobile device associated with at least one tenant of at least one on-demand service is received, the command including at least one mobilized object. See operation 102.

In the context of the present description, an on-demand service refers to any service that that is accessible over a network. In one embodiment, the on-demand service may include an on-demand database service. In this case, an on-demand database service may include any service that relies on a database system that is accessible over a network.

In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Additionally, in the context of the present description, a tenant refers to any user of the on-demand service. For example, in various embodiments, the tenants may include customers, subscribers, developers, administrators, and any other users of the on-demand service.

In one embodiment, the command to define a view for the at least one mobile device may be received from a user interface. The user interface may include any interface capable of being utilized by a user. For example, in various embodiments, the user interface may include a web page, a web browser, an interface provided in an email, an email template, and/or any other interface capable of being utilized by a user.

Furthermore, a mobilized component refers to any item encapsulating at least a definition of one or more visual objects and associated attributes, where the visual objects may be associated with a user interface. For example, in various embodiments, the component may include tags such as HTML, Javapages, and ASP.Net, etc. Additionally, the component may include markup language as well as parameters describing behavior.

As shown further in FIG. 1, at least one instruction is generated for defining the view for the at least one mobile device, the at least one instruction being based at least in part on the at least one mobilized object. See operation 104. In one embodiment, the instruction may include at least one controller instruction for a user interface controller on the at least one mobile device.

In this case, the user interface controller may include any controller for controlling the user interface and/or accessing a portion of storage. Furthermore, the user interface controller may include any logic to facilitate such control and/or access. For example, the user interface controller may include logic for displaying a user interface corresponding to the view for the mobile device.

In either case, the instruction may be capable of being executed by a processor of the mobile device for defining the view of the mobile device. Additionally, the mobilized object may include one or more fields. In this case, the instruction may include instructions to retrieve at least one value corresponding to the one or more fields of the mobilized object.

For example, the value corresponding to the one or more fields may be retrieved from a portion of storage associated with the tenant. In one embodiment, the value may be capable of being processed to provide the view of the mobile device. In addition, the view of the mobile device may be displayed on the mobile device.

In one embodiment, the command to define the view may include at least one attribute. The attribute may include any attribute associated with the component, such as an image attribute (e.g. color, size, etc.), a text attribute (e.g. font, size, etc.), and/or any other attribute associated with the mobilized component. In this case, a portion of storage associated with the tenant may be accessed to retrieve at least one value of the attribute.

Furthermore, the at least one instruction for defining the view is pushed to the at least one mobile device associated with the at least one tenant. See operation 106. In other words, the instruction may be sent to the mobile device. As an option, the mobile device may execute the instruction utilizing a processor such that the view is defined.

It should be noted that the view for the mobile device may include any view that may be displayed on a mobile device. For example, in various embodiments, the view for the mobile device may include a user interface, a screen display, and/or any other type of view that may be displayed.

In one embodiment, the instruction may be stored in a storage location associated with the tenant. As an option, the pushing of the instruction to the mobile device may be performed automatically. For example, the pushing of the instruction to the mobile device may be performed automatically and the pushing may be triggered by the storage of the at least one instruction in the storage location associated with the tenant.

As another option, the instruction may include at least one unique identifier (e.g. a token etc.). In this case, the unique identifier may be utilized for validation of the instruction. For example, the mobile device may utilize the at least one unique identifier for performing the validation. In this way, it may be determined that the instruction is a valid instruction from a valid source.

Figure 2:
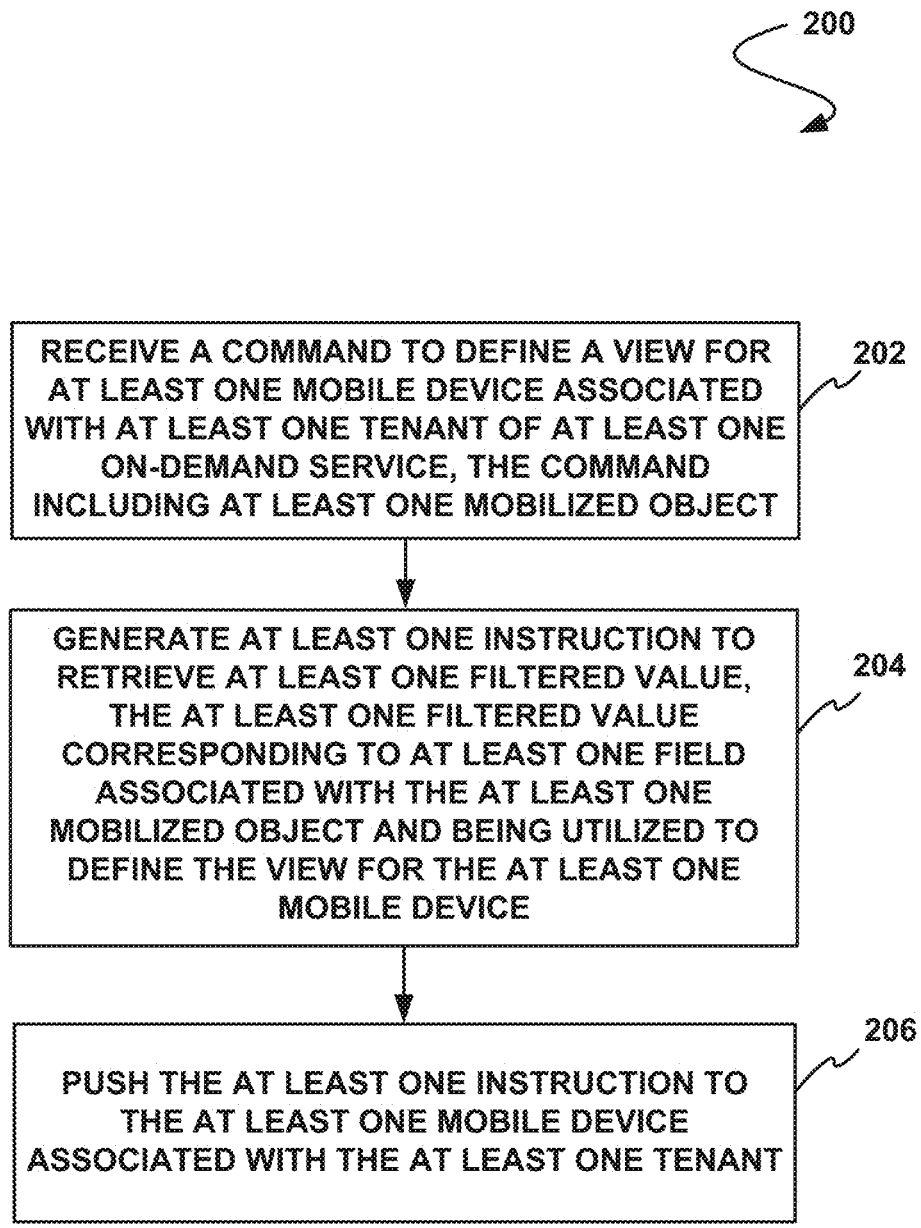
FIG. 2 shows a method for creating mobile custom views with filtering for tenants of an on-demand database service, in accordance with one embodiment.

In some cases, information used to generate the instructions for defining the view may be filtered. For example, at least one instruction may be generated to retrieve at least one filtered value for providing the view for the mobile device, where the filtered value corresponds to at least one field associated with the mobilized object FIG. 2 shows a method 200 for creating mobile custom views with filtering for tenants of an on-demand database service, in accordance with one embodiment. As an option, the present method 200 may be implemented in the context of the functionality of FIG. 1. Of course, however, the method 200 may be carried out in any desired environment. The aforementioned definitions may apply during the present description.

As shown, a command to define a view for at least one mobile device associated with at least one tenant of at least one on-demand service is received, the command including at least one mobilized object. See operation 202.

Additionally, at least one instruction to retrieve at least one filtered value is generated, the at least one filtered value corresponding to at least one field associated with the at least one mobilized object and being utilized to define the view for the at least one mobile device. See operation 204. In one embodiment, the filtered set of values may result from the application of a filter to an unfiltered set of values retrieved from a portion of storage associated with the at least one tenant.

For example, the mobilized object may include at least one field. In this case, the field may include one or more display fields, a sort order field, a title field, and/or various other fields. Furthermore, the instruction may include instructions to retrieve at least one value corresponding to the field of the mobilized object. The values may include any values for the fields, including characters, strings, and/or any other value.

In one embodiment, the value corresponding to the field may be retrieved from a portion of storage associated with the tenant. This value corresponding to the at least one field may then be filtered. Thus, a result of the filtering may include the filtered value. As shown further in FIG. 2, the at least one instruction may be pushed to the at least one mobile device associated with the at least one tenant. See operation 206.

Figure 3:
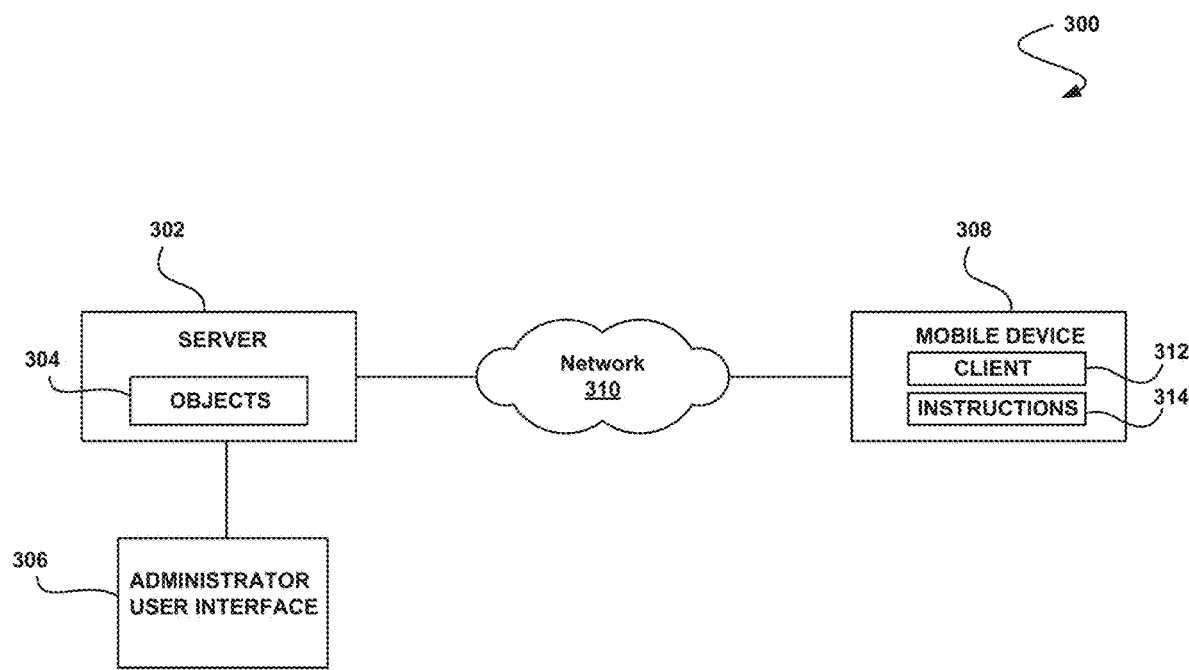
FIG. 3 shows a system for creating mobile custom views, with or without filtering, for tenants of an on-demand database service, in accordance with one embodiment.

FIG. 3 shows a system 300 for creating mobile custom views, with or without filtering, for tenants of an on-demand database service, in accordance with one embodiment. As an option, the system 300 may be implemented in the context of the functionality of FIGS. 1-2. Of course, however, the system 300 may be implemented in any desired environment. Again, the aforementioned definitions may apply during the present description.

As shown, a server 302 of an on-demand database service is provided. As shown further, a plurality of mobilized objects 304 are stored on the server 302. The server 302 is accessible by an administrator user interface 306. The administrator user interface 306 may include any user interface accessible by a user. In one embodiment, the administrator user interface 306 may be provided by the on-demand database service.

As shown further, the server 302 is in communication with at least one mobile device 308 over one or more networks 310. The mobile device 308 may include a client application 312 and storage for one or more instructions 314 sent from the server 302. It should be noted that the mobile device 308 may include any mobile device including a handheld computer, a mobile phone, a personal digital assistant (PDA), and/or any other device.

In operation, an administrator may access the server 302 utilizing the administrator user interface 306 and may push information from the server 302 to the mobile device 308. In one embodiment, the administrator user interface 306 may include a custom view feature. The custom view feature of the administrator user interface 306 may allow administrators to create custom list views that are pushed to the one or more mobile devices 308.

Using the administrator user interface 306, custom views may be defined for mobile configurations on individual mobile devices or groups of mobile devices. An administrator may create custom views for each mobilized object in the mobile configuration. Administrators may create, edit, and delete mobile custom views for any mobile device associated with their organization.

Any number of custom views may be created for each mobile object. In one embodiment, however, a limit may be placed on the number of custom views that may be created per object. For example, in one embodiment, the limit of custom views that can be created per object may be ten, etc.

Furthermore, the custom views for each mobilized object in the mobile configuration may include a variety of view properties. For example, in one embodiment, the mobile custom list views may include a two column display. As an option, the mobile custom list views may be limited to a two-column display.

In another embodiment, the custom views may be applied to all records on a mobile device. Additionally, as an option, the custom views may be applied to only records on a mobile device. In these cases, administrators may not have the ability to restrict the custom view to only certain records.

In another embodiment, custom list views may only use fields that are on the mobile device in custom list view filters. For example, if a field that is used in a mobile view is excluded from a mobile configuration, administrators may not be able to save that configuration. As an option, administrators may be notified that the field is used in a list view.

In some cases, administrators may locate the list views and redefine the list views to avoid using the field they wish to exclude. By defining the list views, administrators are unlikely to need to make many changes to configurations once the list views are configured. In one embodiment, the administrator may have the ability to save the list view configuration with excluded fields and mark the views that are unusable with an alert symbol. All views that are marked with this alert signal may be treated as not mobilized. Furthermore, administrators may be presented with functionality to sort the records in the list.

Figure 4:
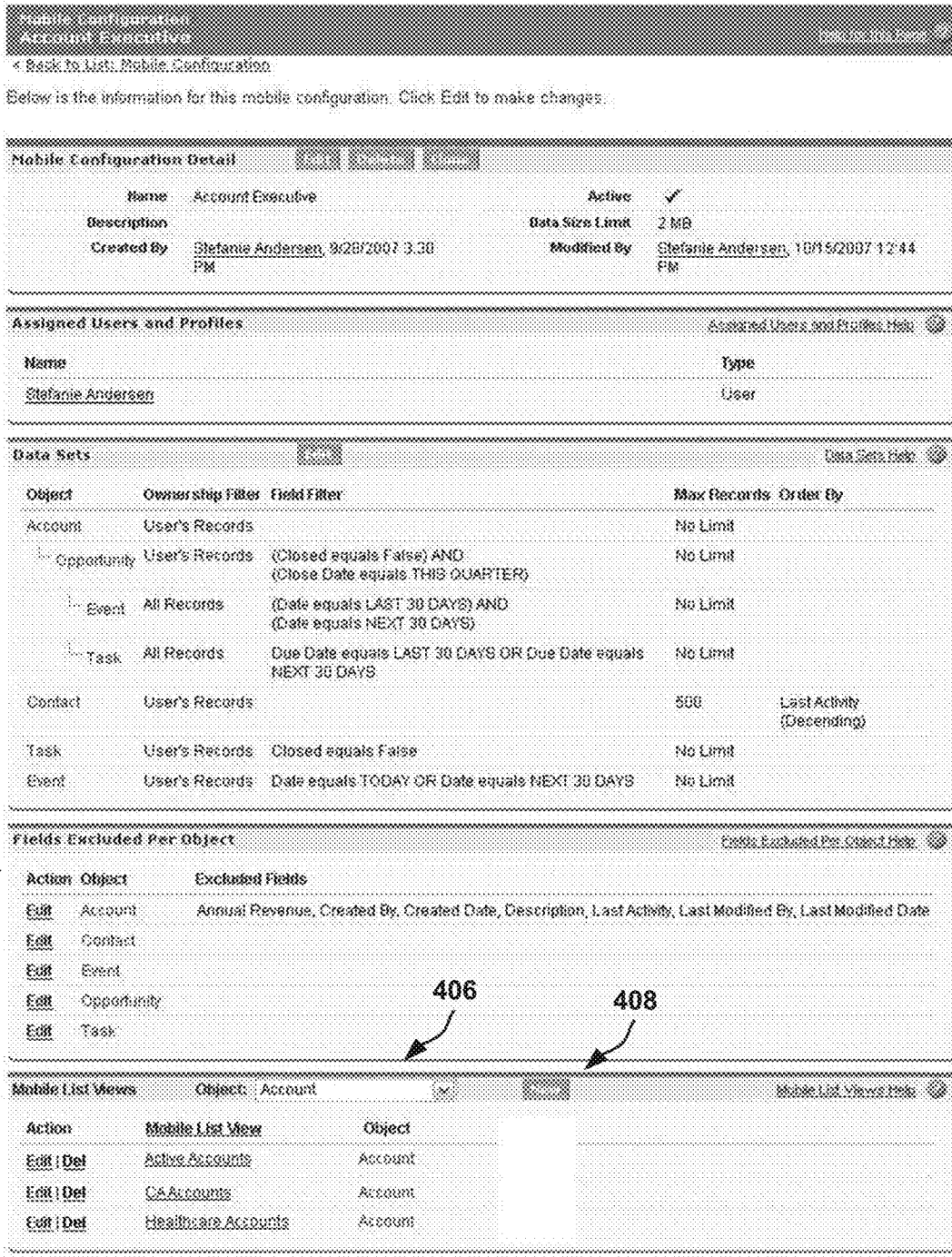
FIG. 4 shows a user interface for creating mobile custom views, with or without filtering, for tenants of an on-demand database service, in accordance with one embodiment.

FIG. 4 shows a user interface 400 for creating mobile custom views, with or without filtering, for tenants of an on-demand database service, in accordance with one embodiment. As an option, the user interface 400 may be implemented in the context of the functionality of FIGS. 1-3. Of course, however, the user interface 400 may be implemented in any desired environment. Additionally, the aforementioned definitions may apply during the present description.

As shown, the user interface 400 may be displayed to a tenant (e.g. an administrator, etc.) as a mobile device configuration detail page. The user interface 400 may be presented to the tenant on a server side of an on-demand database service.

A mobile custom views related list 402 is provided and may be located at the bottom of the user interface 400 below an excluded fields related list 404. Furthermore, a drop down menu mobile object pick list 406 may be provided, as shown at the top of the related list 402. The drop down menu mobile object pick list 406 may let administrators select an object view to display.

In one embodiment, an "All Objects" option may be available so that administrators can see all their custom views at one time. As an option, the mobilized objects may appear in the drop down menu mobile object pick list 406 in alphabetical order. As another option, a default view may be set such that All Objects option is displayed.

In one embodiment, the custom views in the related list 402 may appear in the order the administrator created them. Furthermore, each object may initially have no list views. As an option, a mobile list view column in the related list 402 may be able to be sorted. In this way, the administrator may then see the views in ascending or descending alphabetic order by their name. If the administrator is using the All Objects option, the object column may also be sortable.

In one embodiment, an active flag may be used to indicate whether a view is active or inactive. Furthermore, as an option, clicking a "New" button 408 may take administrators to another user interface for creating new mobile view pages for a selected mobilized object.

If the administrator is using the All Objects option, the administrator may first select an object from the drop down menu mobile object pick list 406, and then the "New" button 408 for creating new mobile view pages for the selected object displays. It should be noted that, in one embodiment, the list view may show summary fields such as a data set view which may include, a "View Filter" option, a "Columns Visible" option, and an "Order By" option for the list view.

Figure 5:
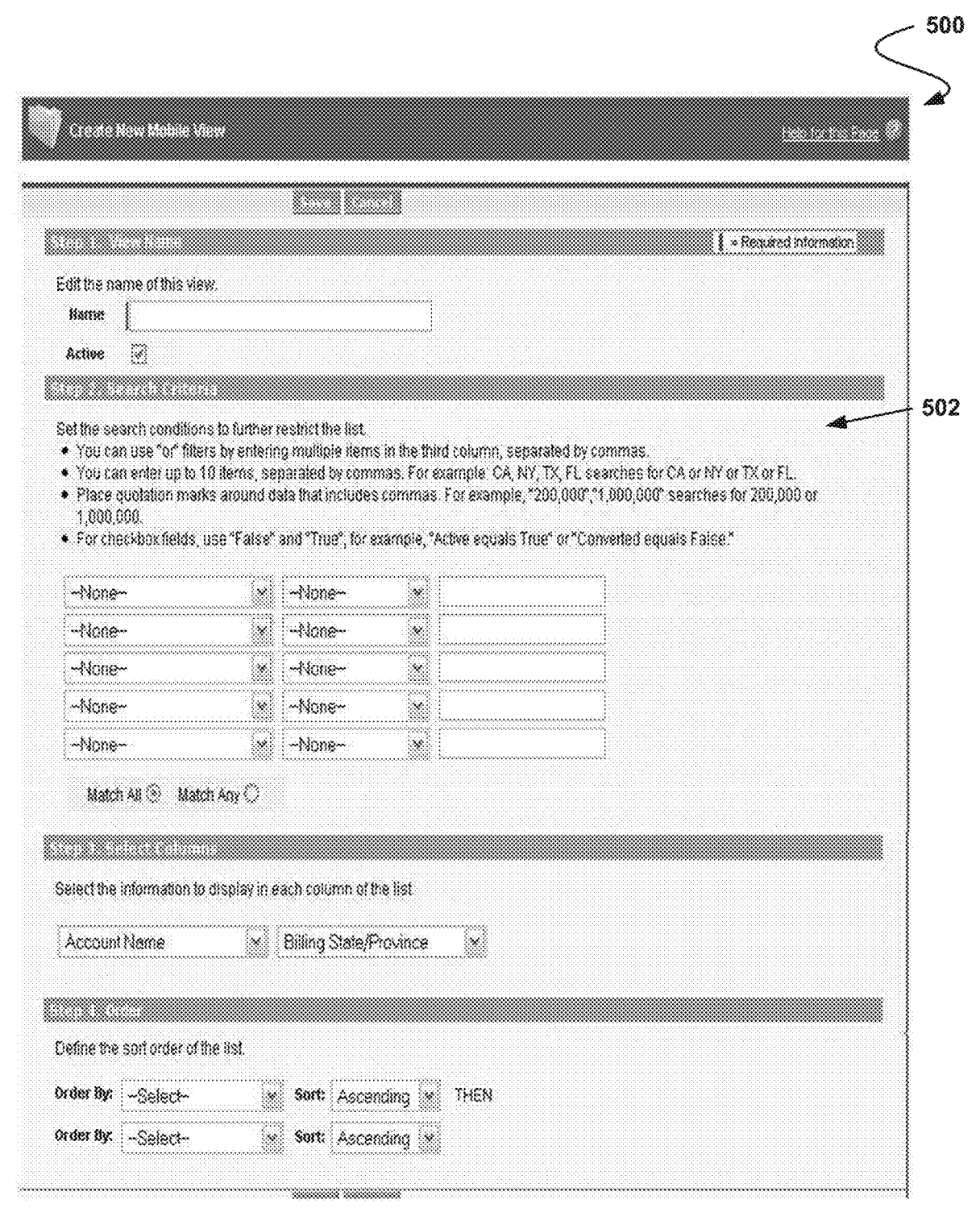

FIG. 5 shows a user interface 500 for creating and editing mobile view pages for a selected mobile object, in accordance with one embodiment. As an option, the user interface 500 may be implemented in the context of the functionality of FIGS. 1-4. Of course, however, the user interface 500 may be implemented in any desired environment. Again, the aforementioned definitions may apply during the present description.

In operation, a tenant (e.g. an administrator, etc.) may utilize the user interface 500 to enter a mobile device view name. In one embodiment, the view name may include a character limit restriction (e.g. 30 characters, etc.). This character limit restriction may be utilized such that the view name may be displayed on the mobile device, for example.

As an option, the new view name established by the administrator may be set to active by default. Once the view name is defined, search criteria may be defined. In this case, the search criteria may be utilized to filter mobilized objects, fields of mobilized objects, and/or values of mobilized objects in a list of mobilized objects.

In one embodiment, "OR" filters may be utilized to filter items. Furthermore, "AND" filters may be utilized to filter items. In this way, multiple terms may be used to filter items such that only certain items in the list are displayed. In one embodiment, filtering options may be displayed on the user interface 500 in a search criteria or filtering option section 502.

The fields utilized for filtering may include any number of fields associated with the mobilized objects. For example, the fields may include an application ID to match an application record, a title for the custom view, a first display field (e.g. a first column, etc.), a second display field (e.g. a second column, etc.), a database name (e.g. an on-demand database contact where the view will operate, etc.), and various other fields.

Additionally, the object may include one or more virtual fields. These fields may include a default field for the object (e.g. a "Name" field, etc.), a phone field (e.g. the first field of type "phone"), and a date field (e.g. a due date field for an activity due date, activity due date time for an activity, etc.), etc.

Table 1 shows a non-exclusive list of operators that may be used for filtering, in accordance with one embodiment.

TABLE 1

| Operator | Function |
| --- | --- |
| = | equals |
| > | greater than |
| >= | greater than or equals |
| < | less than |
| <= | less than or equals |
| bt | between |
| != | not equals |
| b | begins with |
| e | ends with |
| c | contains |

In one embodiment, instead of the operators listed in Table 1, three operators may be utilized, "equal to," "after," and "before." Furthermore, in the context of filtering, dates may be filtered based on relative values. For example, one structure of a date value may be (+/−)(interval)(unit). Thus, the date may be specified as a differential from the current date.

Table 2 shows some example values for dates, in accordance with one embodiment. In this case, the units are represented as "d" for days, "w" for weeks, "q" for quarters, and "y" for years.

TABLE 2

| |
| --- |
| "+0d" today |
| "+1d" tomorrow |
| "−1w" last week |
| "+0w" this week |
| "+1w" next week |
| "−1m" last month |
| "+0m" this month |
| "+1m" next month |
| "−1q" last quarter |
| "+0q" this quarter |
| "+1q" next quarter |
| "−1y" last year |
| "+0y" this year |
| "+1y" next year |

As an option, the unit may expand into a relative date range. For example, if equal to "+0w" is specified, the date may be expanded to "between Monday and Sunday" inclusive. If less than or equal to "−1w" is specified, the date may be expanded to "last week or older."

The filters may include the operand and the parameters to the operand. In one embodiment, many filters may be changed together by other filters to achieve complex Boolean logic. For example. Table 3 shows a filter configuration, in accordance with one embodiment.

TABLE 3 f1-o==
f1-1=vMailingState
f1-2=CA

In this example, the "f" indicates a filter is being specified. Additionally, the "1" following the "f" is the filter number. In one embodiment, the filter number may begin at one and increase in order. The "o" parameter is the operator (e.g. from Table 1, etc.). The rest of the field values may become the parameters for the operator. In various embodiments, different operators may have a different number of parameters. As shown further in Table 3, in one embodiment, field names may be prefixed with a "v."

In one embodiment, various filters may be combined using AND, OR, and NOT operators in complex trees. For example, another filter may be added using one of the valid operators for filters. In this case, all of the operands may be applied to the operator.

Table 4 shows operators for combining filters, in accordance with one embodiment.

TABLE 4

| Operator | Function |
| --- | --- |
| AND | AND all operands together |
| OR | OR all operands together |
| NOT | logical NOT operator |

Once any filtering criteria has been entered, display columns are selected. For example, information to be displayed in each column of the list may be selected. In one embodiment, two columns may be available for mobile views.

Once the display columns are selected, a sort order for the data in the mobile list view is defined. In this case, administrators may optionally sort the data in the list view by two fields in either ascending or descending order. As an option, sort order may be identified by object fields (e.g. an "o1" and "o2" field, etc.).

In some cases, administrators may want to define the order in which the custom views and standard views appear in a list on the mobile device (e.g. a drop-down menu pick list, etc.). In one embodiment, in the mobile views related list, the views for an object may appear in the order the administrator defined using a "define view order" button. If the administrator does not define the order, the standard list views may appear first, and then the custom views may appear in the order they were created.

As an option, clicking the define view order button when an object is selected in the related list may display an "Edit View Order" page for the selected object. Using this interface, administrators may be presented with an option to check a box to alphabetize the list views in a "Views" menu on the mobile device. Furthermore, administrators may arrange the list views in the proper sequence using the interface.

In one embodiment, both custom views and standard views may be displayed in a "List Views" list box. In some cases, administrators may want the ability to disable the standard list views on the mobile device. For example, each object may initially have two list views, "All Records" and "My Records," which may be the standard views. In this case, the All Records view may be the default view for the mobile device. Making the standard views available in the related list may allow administrators to manage the order of the standard and custom views, and to disable the standard views, if desired.

In these cases, administrators may see limited information for standard views on the detail page because standard views may not necessarily be configured the same way a custom view may be configured. Furthermore, administrators may disable or enable custom views for the mobile device using an "Edit Mobile View" interface.

Figure 6:
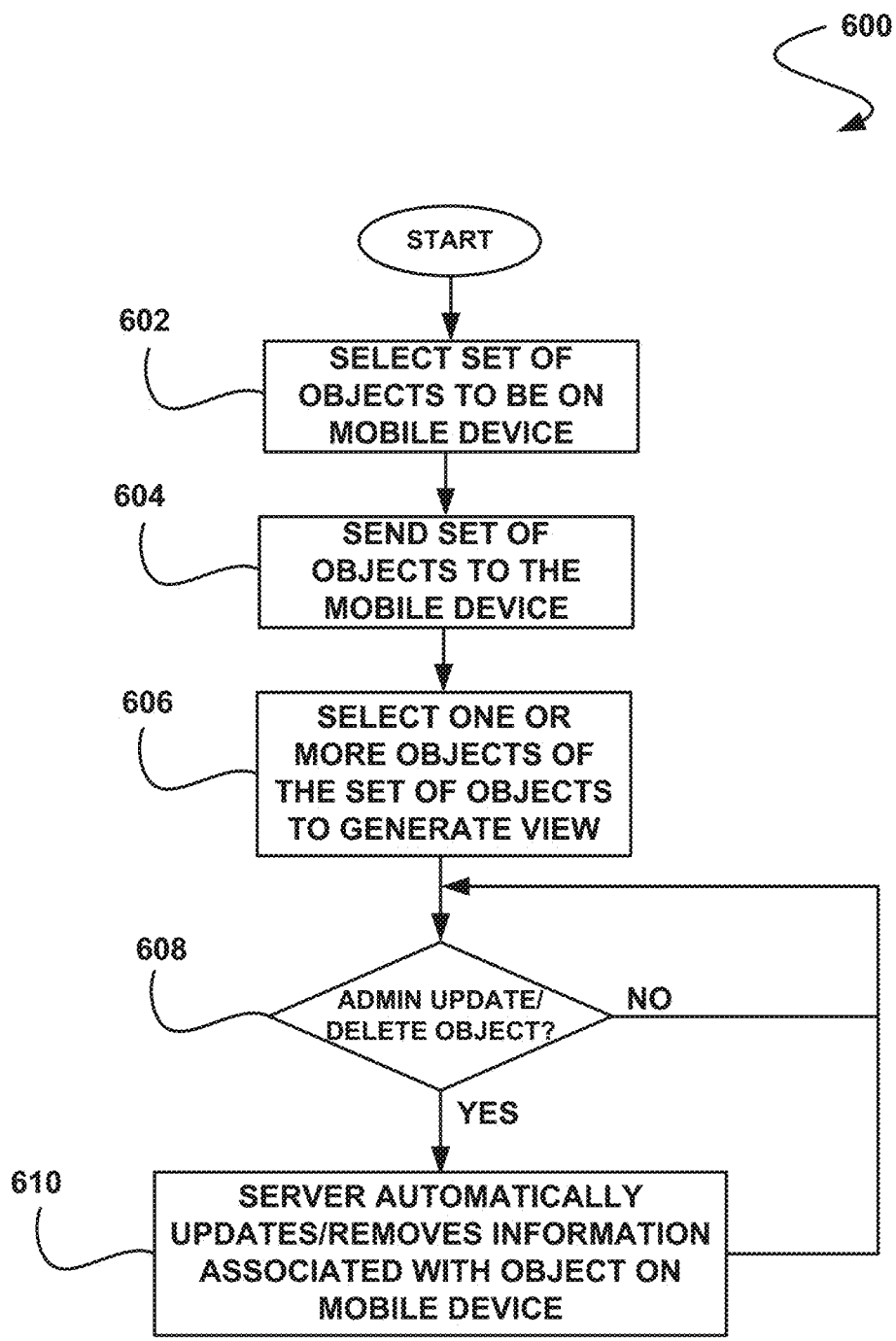
FIG. 6 shows a method for creating mobile custom views, with or without filtering, for tenants of an on-demand database service, in accordance with one embodiment.

FIG. 6 shows a method 600 for creating mobile custom views, with or without filtering, for tenants of an on-demand database service, in accordance with one embodiment. As an option, the present method 600 may be implemented in the context of the functionality of FIGS. 1-5. Of course, however, the method 600 may be carried out in any desired environment. The aforementioned definitions may apply during the present description.

As shown, an administrator selects a set of mobilized objects to be on a mobile device. See operation 602. The selected set of mobilized objects is then sent to the mobile device. See operation 604.

In this case, an administrator using an interface on a server side of an on-demand database service may select the set of mobilized objects utilizing an administrator accessible interface. Upon selection, the administrator may store the selected set of mobilized objects and the objects may be pushed to the mobile device.

Using the administrator interface, the administrator may then select one or more objects of the set of objects to generate a view for the mobile device. See operation 606. These objects may be indicated to the mobile device in the form of instructions such that, upon execution of the instructions, the view for the mobile device will be displayed on the mobile device. In one embodiment, the instructions may be generated at a server of the on-demand database service. In another embodiment, the instructions may be generated at the mobile device.

Furthermore, it is determined whether the administrator updates or deletes any of the objects using the administrator interface. See operation 608. For example, the administrator may update or delete an object from a storage location associated with a tenant on a server of the on-demand database service. Upon update or deletion, the server of the on-demand database service may update or delete information associated with the object on the mobile device. See operation 610.

System Overview

Figure 7:
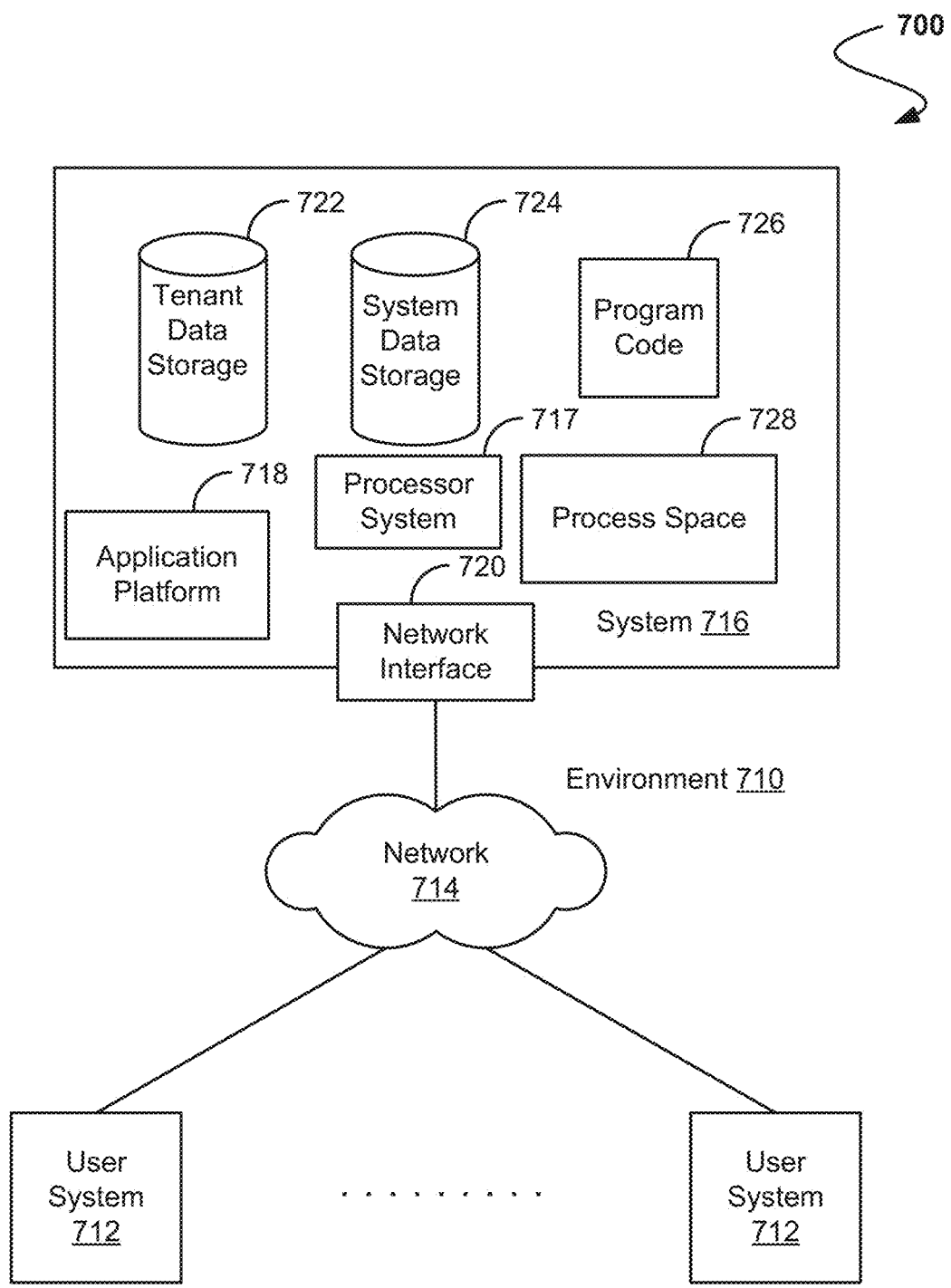
FIG. 7 illustrates a block diagram of an example of an environment wherein an on-demand database service might be used.

FIG. 7 illustrates a block diagram of an environment 710 wherein an on-demand database service might be used. As an option, any of the previously described embodiments of the foregoing figures may or may not be implemented in the context of the environment 710. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

Figure 8:
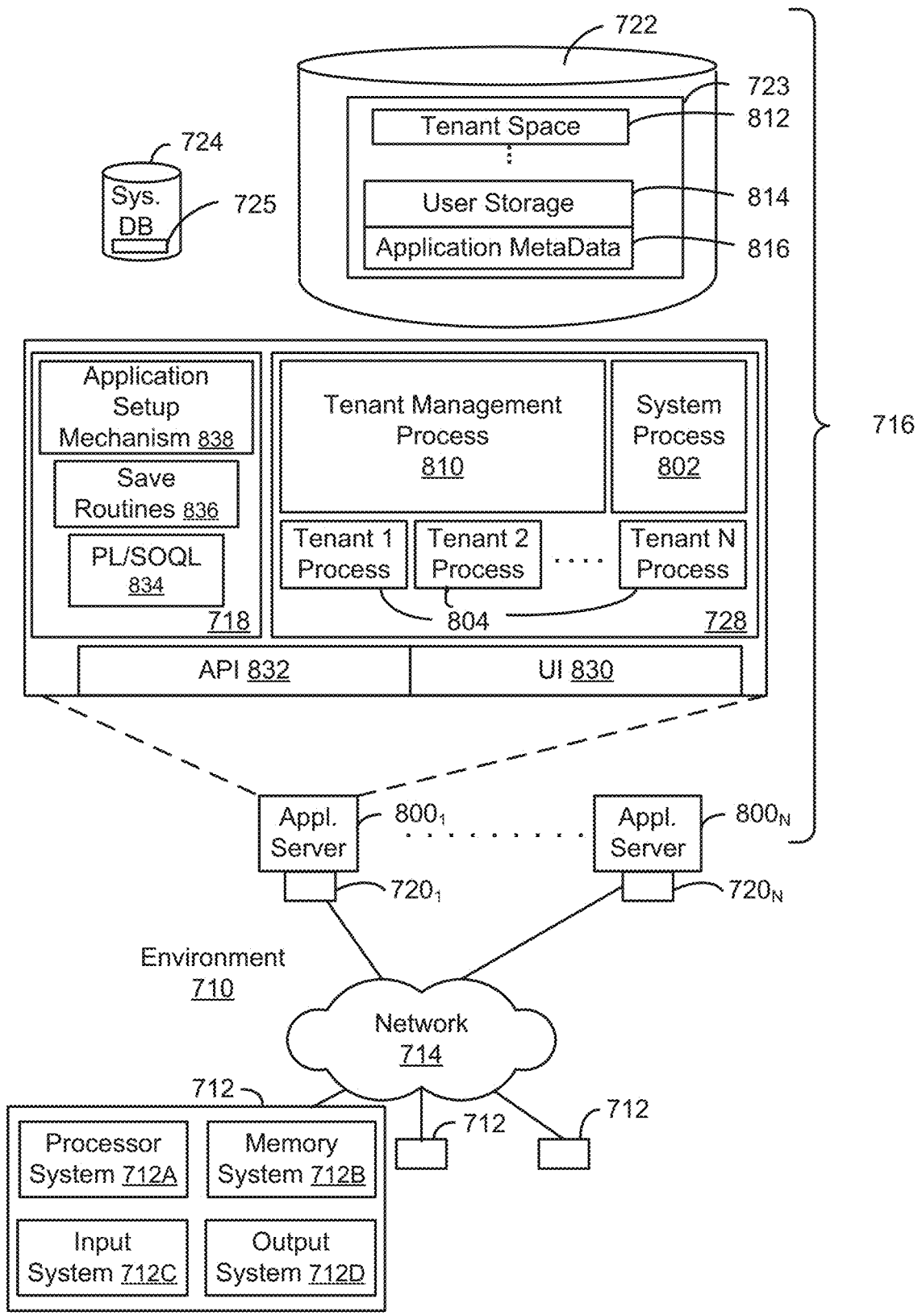
FIG. 8 illustrates a block diagram of an embodiment of elements of FIG. 7 and various possible interconnections between these elements.

One arrangement for elements of system 716 is shown in FIG. 8, including a network interface 720, application platform 718, tenant data storage 722 for tenant data 723, system data storage 724 for system data accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717 of FIG. 7, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800₁ might be coupled via the network 714 (e.g., the Internet), another application server 800_{N-1} might be coupled via a direct network link, and another application server 800_N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of identifying and providing a customized mobilized component to a mobile device or tablet, the method comprising:

receiving, at a server corresponding to an on-demand multi-tenant database service, a specific application from an application developer, the specific application including an application programming interface (API) configured to receive the customized mobilized component, wherein the application developer corresponds to a tenant of the on-demand multi-tenant database service and wherein the specific application is associated with the tenant and is different from one or more applications associated with different tenants of the multi-tenant database service;

receiving, at the server, a request from the mobile device or tablet for the specific application;

providing the specific application to the mobile device or tablet in response to receiving the request from the mobile device or tablet;

receiving, at the server, a request for the customized mobilized component as result of the specific application being executed on the mobile device or tablet, the request for the customized mobilized component including one or more values used to select the customized mobilized component;

selecting, from among a plurality of customized mobilized components that are associated with the tenant and based at least in part on receiving the request as the result of the specific application being executed on the mobile device or tablet, the customized mobilized component that corresponds to the one or more values accompanying the request for the customized mobilized component, wherein the plurality of customized mobilized components associated with the tenant differs from one or more customized mobilized components employed by the different tenants of the on-demand multi-tenant database service; and transmitting, for display on the mobile device or tablet, the selected customized mobilized component.

2. The method of claim 1, wherein the selecting of the customized mobilized component uses (i) the one or more values included in the received request for the customized mobilized component and (ii) values of one or more fields associated with the customized mobilized component, to select the customized mobilized component.

3. The method of claim 2, wherein the one or more values included in the received request for the customized mobilized component includes a value that identifies a particular account holder whose data is stored in an on-demand database, and wherein the selecting of the customized mobilized component further uses data from the on-demand database for the particular account holder identified by the one or more values, to select the customized mobilized component.

4. The method of claim 3, wherein the on-demand database includes geographical information of the particular account holder, and wherein the selecting of the customized mobilized component further uses the geographical information of the particular account holder to select the customized mobilized component.

5. The method of claim 3, wherein the on-demand database is utilized by the on-demand multi-tenant database service for providing the customized mobilized component.

6. The method of claim 2, wherein the one or more values included in the received request for the customized mobilized component includes a value that identifies a particular user of the mobile device or tablet, wherein the value that identified the particular user of the mobile device is linked to related information about the particular user and that is stored in an on-demand database, and wherein the selecting of the customized mobilized component further uses the related information about the particular user to select the customized mobilized component.

7. The method of claim 6, wherein the on-demand database includes geographical information of the particular user, and wherein the selecting of the customized mobilized component further uses the geographical information of the particular user to select the customized mobilized component.

8. The method of claim 6, wherein the on-demand database is utilized by the on-demand multi-tenant database service for providing the customized mobilized component.

9. The method of claim 2,
wherein the one or more values included in the received request for the customized mobilized component includes a value that identifies the specific application, and
wherein the selecting of the customized mobilized component further uses the value that identifies the specific application to select the customized mobilized component.

10. The method of claim 2,
wherein the one or more values included in the received request for the customized mobilized component includes a value that identifies a particular screen size of the mobile device or tablet, and
wherein the selecting of the customized mobilized component further uses the value that identified the particular screen size to select the customized mobilized component.

11. The method of claim 2,
wherein the one or more values included in the received request for the customized mobilized component includes a value that identifies a type of mobilized component, and
wherein the selecting of the customized mobilized component further uses the value that identifies the type of mobilized component to select the customized mobilized component.

12. The method of claim 2,
wherein the one or more values included in the received request for the customized mobilized component includes a value that represents information related to the mobile device or tablet, and
wherein the selecting of the customized mobilized component further uses the information related to the mobile device or tablet to select the customized mobilized component.

13. The method of claim 1, wherein the customized mobilized component includes media content.

14. A non-transitory computer readable storage medium impressed with computer program instructions to identify and provide a customized mobilized component to a mobile device or tablet, the instructions, when executed on a processor, implement a method comprising:
receiving, at a server corresponding to an on-demand multi-tenant database service, a specific application from an application developer, the specific application including an application programming interface (API) configured to receive the customized mobilized component, wherein the application developer corresponds to a tenant of the on-demand multi-tenant database service and wherein the specific application is associated with the tenant and is different from one or more applications associated with different tenants of the multi-tenant database service;
receiving, at the server, a request from the mobile device or tablet for the specific application;
providing the specific application to the mobile device or tablet in response to receiving the request from the mobile device or tablet;
receiving, at the server, a request for the customized mobilized component as result of the specific application being executed on the mobile device or tablet, the request for the customized mobilized component including one or more values used to select the customized mobilized component;
selecting, from among a plurality of customized mobilized components that are associated with the tenant and based at least in part on receiving the request as the result of the specific application being executed on the mobile device or tablet, the customized mobilized component that corresponds to the one or more values accompanying the request for the customized mobilized component, wherein the plurality of customized mobilized components associated with the tenant differs from one or more customized mobilized components employed by the different tenants of the on-demand multi-tenant database service; and
transmitting, for display on the mobile device or tablet, the selected customized mobilized component.

15. The non-transitory computer readable storage medium of claim 14, wherein the selecting of the customized mobilized component uses (i) the one or more values included in the received request for the customized mobilized component and (ii) values of one or more fields associated with the customized mobilized component, to select the customized mobilized component.

16. The non-transitory computer readable storage medium of claim 14, wherein
the one or more values included in the received request for the customized mobilized component includes a value that identifies a particular account holder whose data is stored in an on-demand database, and
wherein the selecting of the customized mobilized component further uses data from the on-demand database for the particular account holder identified by the one or more values, to select the customized mobilized component.

17. A system including one or more processors coupled to a memory, the memory loaded with computer instructions to identify and provide a customized mobilized component to a mobile device or tablet, the instructions, when executed on the processors, implement actions comprising:
receiving, at a server corresponding to an on-demand multi-tenant database service, a specific application from an application developer, the specific application including an application programming interface (API) configured to receive the customized mobilized component, wherein the application developer corresponds to a tenant of the on-demand multi-tenant database service and wherein the specific application is associated with the tenant and is different from one or more applications associated with different tenants of the multi-tenant database service;
receiving, at the server, a request from the mobile device or tablet for the specific application;
providing the specific application to the mobile device or tablet in response to receiving the request from the mobile device or tablet;
receiving, at the server, a request for the customized mobilized component as result of the specific application being executed on the mobile device or tablet, the request for the customized mobilized component including one or more values used to select the customized mobilized component;
selecting, from among a plurality of customized mobilized components that are associated with the tenant and based at least in part on receiving the request as the result of the specific application being executed on the mobile device or tablet, the customized mobilized component that corresponds to the one or more values accompanying the request for the customized mobilized component, wherein the plurality of customized mobilized components associated with the tenant differs from one or more customized mobilized components employed by the different tenants of the on-demand multi-tenant database service; and transmitting, for display on the mobile device or tablet, the selected customized mobilized component.

18. The system claim 17, wherein the selecting of the customized mobilized component uses (i) the one or more values included in the received request for the customized mobilized component and (ii) values of one or more fields associated with the customized mobilized component, to select the customized mobilized component.

19. The system of claim 18, wherein the one or more values included in the received request for the customized mobilized component includes a value that identifies a particular account holder whose data is stored in an on-demand database, and wherein the selecting of the customized mobilized component further uses data from the on-demand database for the particular account holder identified by the one or more values, to select the customized mobilized component.

* * * * *